Figure 1:
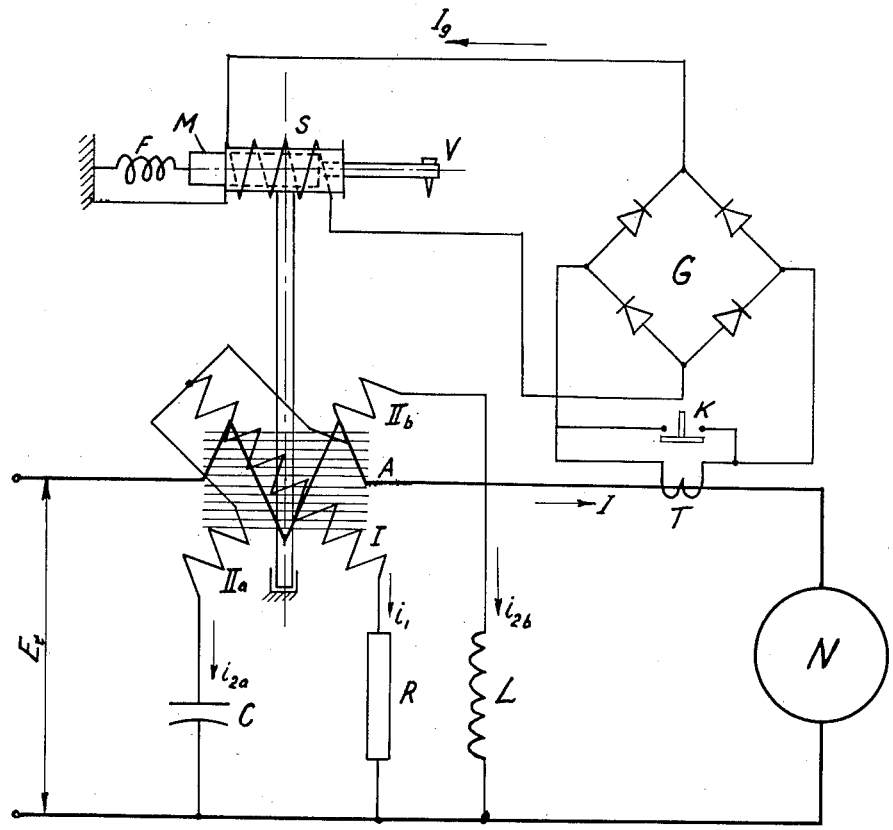

June 30, 1953 V. A. KINICKIJ 2,643,933
CIRCLE DIAGRAM RECORDER
Filed April 27, 1951

INVENTOR.
BY

Patented June 30, 1953

2,643,933

UNITED STATES PATENT OFFICE 2,643,933

CIRCLE DIAGRAM RECORDER

Viktor A. Kinickij, Sao Paulo, Brazil

Application April 27, 1951, Serial No. 223,346
In Brazil March 28, 1951

8 Claims. (Cl. 346—29)

The object of my invention is a recorder which is able to record a circle diagram of an induction motor or any other network directly. The circle diagram is very useful for an investigation of induction motors or other networks operating at a constant terminal voltage and variable load.

I present one instrument which is illustrated in the accompanying drawing.

The instrument consists of (Fig. 1): one crossed coil power factor meter (coils A, I, II$a$ and II$b$), one coil S fixed rigidly on the axle of the instrument, one moving permanent magnet core M of the coil S attached to the spring F which is in turn fixed to the coil frame, one resistor R, one condenser C, one induction coil L, one rectifier G, one current transformer T with shorting switch K and one recording adjustment V.

The resistance R is connected in series with the first moving coil I of the crossed coil power factor meter, therefore the current $i_1$ in this coil is in phase with the voltage.

The second moving coil is fixed at an angle of 90° to the first moving coil and is divided into two equal parts II$a$ and II$b$; part II$a$ is connected in series with a condenser C and part II$b$ is connected in series with an induction coil L. The current $i_{2a}$ is leading at an angle of 90° and the current $i_{2b}$ is lagging at an angle of 90° with respect to the voltage, therefore they are opposed in phase with respect to time, but coils II$a$ and II$b$ are so connected that the currents $i_{2a}$ and $i_{2b}$ add vectorially.

If the frequency increases, the current $i_{2a}$ also increases but the current $i_{2b}$ decreases by the same amount, therefore the torque which is proportional to the sum of the currents $i_{2a}$ and $i_{2b}$ remains the same and the instrument is independent of frequency.

The fixed coil A has an iron core and carries the current I of the network N being studied.

The cross coil power factor meter places the moving system of the instrument at an angle equal to the phase angle between the voltage and current of the network being investigated.

The axis of the coil S takes the direction of the current vector, because the coil S is fixed on the axle of the instrument.

The coil S is energized by the direct current resulting from rectification by rectifier G of the secondary current of transformer T. This current is proportional to the magnitude of the current I flowing in the investigated network, therefore the force between the coil and the permanent magnet is also proportional to the primary current I. A recording appliance is attached to the permanent magnet and this traces the circle diagram on a chart. The chart has rectangular coordinates and the initial point must be in line with the axis of the instrument. The vertical axis must be in line with the voltage vector. The direction of the voltage vector can be determined by an active load.

The current transformer T is shorted out by the switch K at starting, therefore the starting current does not flow through the coil S and the pen of the recording appliance is carried by a controlling spring F into the zero position but the axis of the coil S will move into the position equal to the phase angle. If the switch K is opened, the coil S is energized and a current vector will be traced.

If the load of the network under investigation is variable, the pen will record the circle diagram.

The energy current, the wattless current and the power factor for any load can be determined from the circle diagram.

I claim:

1. A device for recording on a card the circle diagram of an alternating current machine comprising, a power-factor meter having a pivotal shaft; a solenoid mounted on said shaft and having a movable plunger, the axis of said plunger being normal to said shaft; a spring yieldably urging said plunger to retracted position; means for supplying a rectified component of the current from said machine to said solenoid, said solenoid extending the plunger against the retractive action of said spring; and a stylus on said plunger engaging said card, whereby the axis of said plunger will be pivoted by said shaft to assume a position corresponding to the instantaneous power factor of said machine, and whereby said plunger will be extended to assume a position corresponding to the instantaneous current magnitude through the machine, said stylus recording the locus of such instantaneous points on said card.

2. The combination set forth in claim 1 including a switch to turn off said solenoid.

3. The combination set forth in claim 1 wherein said power-factor meter is frequency compensated.

4. A device for recording on a card the circle diagram of an alternating current machine comprising, a power-factor meter having a pivotal shaft; a solenoid mounted on said shaft and having a movable plunger, the axis of said plunger being normal to said shaft; means for yieldably urging said plunger to retracted position; means for supplying a component of the current from said machine to said solenoid, said solenoid extending the plunger against the retractive action of said yieldable means; and a stylus on said plunger engaging said card, whereby the axis of said plunger will be pivoted by said shaft to assume a position corresponding to the instantaneous power-factor of said machine, and whereby said plunger will be extended to assume a position corresponding to the instantaneous current magnitude through the machine, said stylus recording the locus of such instantaneous points on said card.

5. The combination set forth in claim 4 including a switch to turn off said solenoid.

6. The combination set forth in claim 4 wherein said power-factor meter is frequency compensated.

7. A device for recording on a card the circle diagram of an alternating current machine comprising, a pivotally mounted frame; means actuated by the voltage and current input to said machine for varying the angular position of said frame in accordance to the power-factor of said voltage and current; a plunger on said frame movable in a direction normal to the axis of the pivots thereof, a recording stylus on said plunger and engaging said card; and means for extending said plunger to an extent proportional to the instantaneous magnitude of current through said machine.

8. The combination set forth in claim 7 including a switch for rendering said last mentioned means inoperative.

VIKTOR A. KINICKIJ.

References Cited in the file of this patent

UNITED STATES PATENTS

| Number | Name | Date |
|---|---|---|
| 1,064,131 | Craighead | June 10, 1913 |
| 2,157,584 | Woodruff | May 9, 1939 |